United States Patent
Yoshitomi et al.

(10) Patent No.: US 10,169,668 B2
(45) Date of Patent: Jan. 1, 2019

(54) DRIVING ASSISTANCE APPARATUS AND DRIVING ASSISTANCE METHOD (71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Naoto Yoshitomi, Kariya (JP); Jian Hu, Kariya (JP); Shota Satomura, Kariya (JP); Yusuke Fujimaki, Nisshin (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 123 days.

(21) Appl. No.: 15/166,664

(22) Filed: May 27, 2016

(65) Prior Publication Data

US 2016/0350605 A1    Dec. 1, 2016

(30) Foreign Application Priority Data

May 29, 2015    (JP) ................. 2015-110570

(51) Int. Cl.
*G06K 9/00* (2006.01)
*B60Q 9/00* (2006.01)
*G08G 1/0962* (2006.01)

(52) U.S. Cl.
CPC ........... *G06K 9/00818* (2013.01); *B60Q 9/00* (2013.01); *G08G 1/09623* (2013.01)

(58) Field of Classification Search
CPC .................................................. G06K 9/00818
See application file for complete search history.

(56) References Cited

U.S. PATENT DOCUMENTS

| 2007/0177014 | A1 | 8/2007 | Frenzel et al. | |
| 2010/0073152 | A1* | 3/2010 | Nagamine | B60W 50/08 340/425.5 |
| 2013/0113633 | A1* | 5/2013 | Pilutti | G08G 1/096716 340/905 |
| 2015/0213319 | A1 | 7/2015 | Frenzel et al. | |
| 2015/0215550 | A1 | 7/2015 | Frenzel et al. | |

FOREIGN PATENT DOCUMENTS

| JP | 2004-051006 | 2/2004 |
| JP | 2015-035165 | 2/2015 |

* cited by examiner

*Primary Examiner* — James M Pontius
(74) *Attorney, Agent, or Firm* — Knobbe, Martens, Olson & Bear, LLP (57) ABSTRACT

A driving assistance apparatus includes a sign recognizing unit and a notification executing unit. The sign recognizing unit recognizes a traffic sign from an image captured by an on-board imaging apparatus. The notification executing unit notifies a driver of sign information that is information indicated by the traffic sign recognized by the sign recognizing unit. Based on a vehicle speed of the own vehicle and operating information of a turn indicator of the own vehicle under a condition that the driver is being notified of the sign information, the notification executing unit stops notifying the driver of the sign information.

5 Claims, 5 Drawing Sheets

DRIVING ASSISTANCE APPARATUS AND DRIVING ASSISTANCE METHOD

CROSS-REFERENCE TO RELATED APPLICATION

This application is based on and claims the benefit of priority from Japanese Patent Application No. 2015-110570, filed May 29, 2015. The entire disclosure of the above application is incorporated herein by reference.

BACKGROUND

Technical Field

The present disclosure relates to a driving assistance apparatus and a driving assistance method. In particular, the present disclosure relates a technique for assisting in driving of a vehicle.

Related Art

Conventionally, a technique is known in which a traffic sign is recognized from an image of a vehicle periphery captured by an on-board camera. Information indicated by the recognized traffic sign is displayed on a monitor inside a vehicle cabin (for example, refer to Japanese Patent Publication No. 4604088). A driver is able to recognize information on regulations pertaining to a road on which the driver is traveling, guidance information, and the like by visually recognizing the information displayed on the monitor.

The above technique, described in Japanese Patent Publication No. 4604088, is merely that in which a recognition result of an area ahead of a vehicle from an on-board camera is simply displayed. Therefore, even after the road changes as a result of a right turn or a left turn by the vehicle, for example, the recognition result before the road changed may continue to be displayed on the monitor. In this case, the driver may be presented with sign information that differs from the road sign applied to the road on which the vehicle is actually traveling. There is concern that accurate driving assistance cannot be performed.

SUMMARY

It is thus desired to provide a driving assistance apparatus that accurately notifies a driver of information indicated by a traffic sign.

The present disclosure uses the following means to solve the above-described problem.

An exemplary embodiment of the present disclosure provides a driving assistance apparatus that assists in driving of an own vehicle. The driving assistance apparatus includes a sign recognizing unit that recognizes a traffic sign from an image captured by an on-board imaging apparatus, and a notification executing unit that notifies a driver of sign information that is information indicated by the traffic sign recognized by the sign recognizing unit. In addition, when the driver is being notified of the sign information, the notification executing unit stops notifying the driver of the sign information based on a vehicle speed of the own vehicle and operating information of a turn indicator of the own vehicle.

Based on the vehicle speed of the own vehicle and the operating information of the turn indicator, for example, a state in which the road will momentarily change or a state after the road changes in accompaniment with the own vehicle making a left turn or a right turn can be detected. When the road changes, the sign information applied to the own traffic lane may also change in accompaniment. However, as a result of the above-described configuration in which the notification of the sign information is stopped based on the own vehicle speed and the operating information of the turn indicator, a situation in which the driver is provided with uncertain sign information can be prevented to the greatest possible extent. As a result, the driver can be accurately notified of the information indicated by the traffic sign, and the driver can be provided with accurate assistance in safe driving.

DESCRIPTION OF THE EMBODIMENTS

An embodiment implementing a driving assistance apparatus will hereinafter be described with reference to the drawings. The driving assistance apparatus is an on-board apparatus that performs driving assistance of a vehicle based on an image of an area ahead of the vehicle. The image is captured by an imaging apparatus that is mounted in the vehicle. First, an overall configuration of a driving assistance system according to the present embodiment will be described with reference to FIG. 1.

Figure 1:
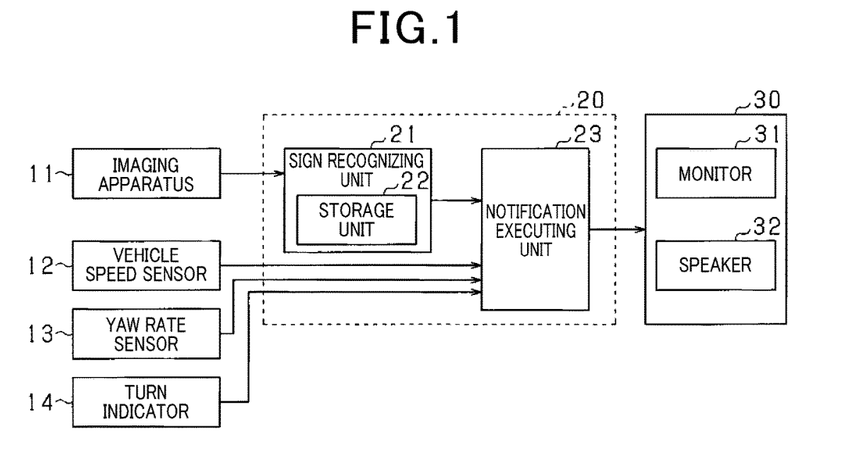
FIG. 1 is a block diagram of an overall configuration of a driving assistance system according to an embodiment.

In FIG. 1, an imaging apparatus 11 is an on-board camera. The imaging apparatus 11 is configured by at least one of a charge-coupled device (CCD) camera, a complementary metal-oxide semiconductor (CMOS) image sensor, a near-infrared camera, and the like. The imaging apparatus 11 is arranged near the upper end of a front windshield of the vehicle, for example. The imaging apparatus 11 captures a surrounding environment including a road ahead of the own vehicle.

A driving assistance apparatus 20 is a computer that includes a central processing unit (CPU), a read-only memory (ROM), a random access memory (RAM), an input/output (I/O), and the like. The driving assistance apparatus 20 includes a sign recognizing unit 21 and a notification executing unit 23. The driving assistance apparatus 20 runs a program stored in a non-transitory, tangible storage medium. The various functions are actualized by the driving assistance apparatus 20 running the program.

The sign recognizing unit 21 acquires an image captured by the imaging apparatus 11. The sign recognizing unit 21 recognizes a traffic sign included in the acquired image by pattern matching. In pattern matching, the sign recognizing unit 21 uses patterns for traffic signs that are prepared in advance, for example. The method for recognizing a traffic sign included in an image is not limited thereto. For example, a method in which recognition is performed through use of a linear classifier may also be used. The sign recognizing unit 21 recognizes a number that is displayed on the traffic sign from features in the recognized traffic sign. The sign recognizing unit 21 stores the recognized number on the traffic sign in a storage unit 22. The storage unit 22 is configured by a rewritable, non-volatile memory.

The notification executing unit 23 receives input of information (hereafter, sign information) indicated by the traffic sign that is recognized by the sign recognizing unit 21. The notification executing unit 23 then notifies the driver of the inputted sign information. As an example, when a traffic sign displaying a speed limit is recognized, the notification executing unit 23 notifies the driver of a numerical value indicating the speed limit displayed on the sign. The notification executing unit 23 performs notification through a notifying unit 30. The notifying unit 30 includes a monitor 31 that displays an image, a speaker 32 that outputs a warning sound and audio guidance, and the like. According to the present embodiment, the monitor 31 is set in a position inside the vehicle cabin that is visible from the driver. The monitor 31 displays the numerical value indicating the speed limit. The monitor 31 thereby provides the driver with speed limit information applied to the road on which the own vehicle is currently traveling, and prompts caution.

The notification executing unit 23 receives input of detection signals from various sensors provided in the vehicle. The notification executing unit 23 also receives input of operating signals of various equipment operated by the driver. The notification executing unit 23 notifies the driver of the sign information based on these input signals. The various sensors include a vehicle speed sensor 12 that detects the speed of the own vehicle, a yaw rate sensor 13 that detects an angular velocity (yaw rate) in a turning direction of the vehicle, and the like. The yaw rate sensor 13 corresponds to a sensor that detects a steering angle of the vehicle.

The vehicle is also provided with a turn indicator 14 that displays the advancing direction of the vehicle, outside of the vehicle. The turn indicator 14 includes an operating lever that serves as a left/right turn indicating unit. The driver operates the operating lever to input the direction in which the vehicle will turn, that is, a left turn or a right turn. The operating lever is operated by the driver to be set to any of a left indication position, a neutral position, and a right indication position. A turn signal is outputted to the notification executing unit 23 as operating information, based on the position to which the operating lever is operated.

Here, when the vehicle makes a right turn or a left turn, the road basically changes. In accompaniment, the speed limit or the like applied to the road may also change. At this time, when the speed limit or the like before the road changes continues to be displayed on the monitor 31 even after the road changes, the driver is provided with erroneous sign information. In addition, there is concern that accurate driving assistance cannot be performed.

Therefore, when the driver is being notified of the sign information recognized by the sign recognizing unit 21, the notification executing unit 23 stops notifying the driver of the sign information for which notification is currently being given, based on the vehicle speed of the own vehicle and the operating information of the turn indicator 14. Specifically, when the driver is being notified of the sign information, the notification executing unit 23 stops notifying the driver of the sign information if predetermined conditions including the following two conditions (corresponding to first and second conditions) are met: (1) the own vehicle speed becomes lower than a determination vehicle speed and (2) the turn indicator 14 is operated. As a result, an unnatural state in which the driver is provided with uncertain sign information is prevented from occurring.

Figure 2A:
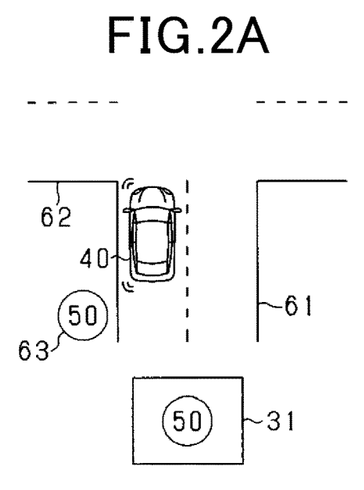
FIGS. 2A and 2B are diagrams of a transition in monitor display during a left turn according to the embodiment.
Figure 2B:
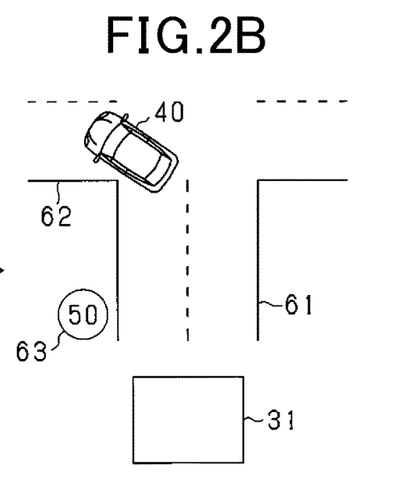

FIGS. 2A and 2B show a transition in the display on the monitor 31 when the own vehicle 40 makes a left turn from a state in which the own vehicle 40 is traveling straight ahead. In FIGS. 2A and 2B, the numerical value indicating the speed limit on a road 61 before the left turn is "50". In the drawings, FIG. 2A indicates a state immediately before the own vehicle 40 approaches an intersection. FIG. 2B indicates a state in which the own vehicle 40 is making a left turn at the intersection.

In FIG. 2A, when an image of a speed limit sign 63 applied to the road 61 is captured by the imaging apparatus 11 in the state in which the own vehicle 40 is traveling straight ahead on the road 61, the numerical value indicated on the speed limit sign 63 is displayed on the monitor 31 as the sign information. Here, as shown in FIG. 2A, the numerical value "50" indicated on the speed limit sign 63 applied to the own traffic lane is displayed on the monitor 31.

A situation is considered in which, in the state in which the sign information applied to the road 61 is displayed on the monitor 31, the own vehicle 40 comes to an intersection. The own vehicle 40 makes a left turn at the intersection, and travels on a road 62 that extends in the left/right direction in relation to the vehicle advancing direction before the left turn. In this case, the notification executing unit 23 stops notifying the driver of the sign information when conditions including the own vehicle speed becoming lower than a determination vehicle speed Vth and the turn indicator 14 being operated are met. Here, as shown in FIG. 2B, the sign information displayed on the monitor 31 is deleted, and the sign information is no longer displayed. The state in which the sign information is not displayed is continued until a traffic sign on the road 62 is recognized. After the completion of the left turn, when an image of a traffic sign on the road 62 is captured by the imaging apparatus 11, the sign information is again displayed on the monitor 31.

Next, driving assistance control according to the present embodiment will be described with reference to the flowcharts in FIGS. 3 and 4. Each process in FIGS. 3 and 4, described below, may be actualized by an electronic circuit, which is hardware. Alternatively, at least a portion may be actualized by software, that is, by a process performed on a microcomputer.

First, a left/right turn determining process performed by the notification executing unit 23 will be described with reference to FIG. 3. This process is performed at a predetermined cycle by the notification executing unit 23.

Figure 3:
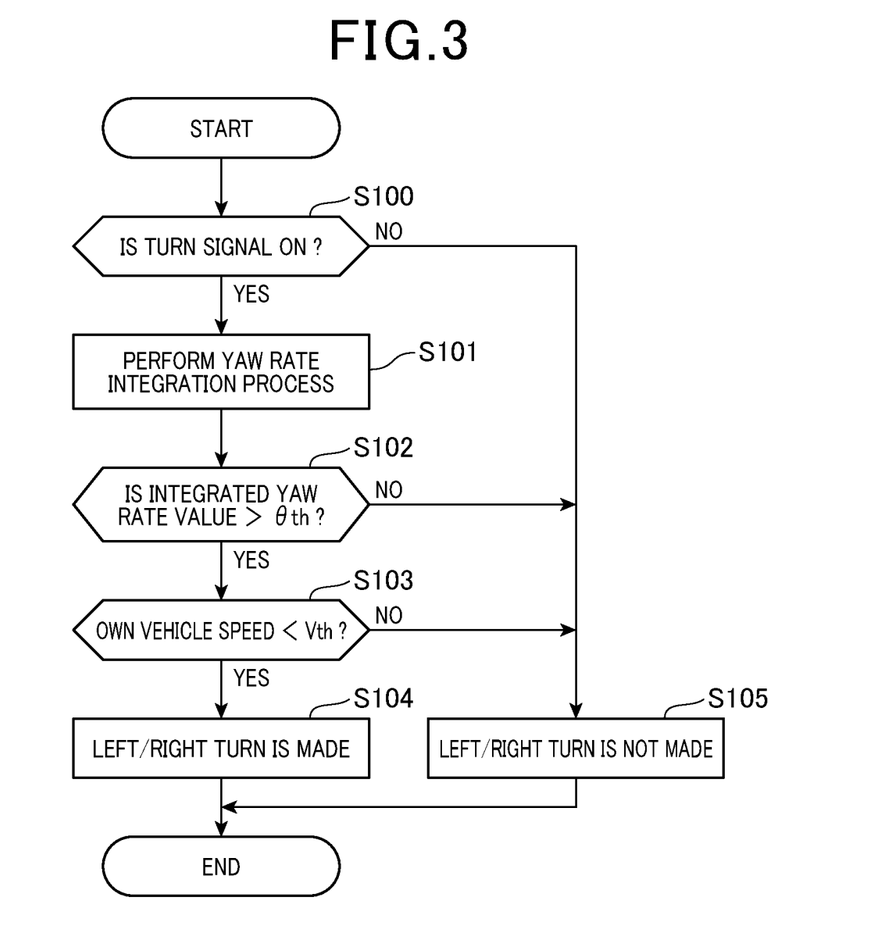
FIG. 3 is a diagram of a flowchart of a processing procedure for a left/right turn determining process according to the embodiment.

In FIG. 3, at step S100, the notification executing unit 23 determines whether or not the turn signal inputted from the turn indicator 14 is switched to on, that is, whether or not the operating lever of the turn indicator 14 is operated and switched from the neutral position to the left indication position or the right indication position. When determined that the turn signal is switched to on, the notification executing unit 23 proceeds to step S101. The notification executing unit 23 calculates an integrated value (hereafter, integrated yaw rate value $\Sigma\theta$) of the yaw rates detected by the yaw rate sensor 13. Here, the integration period is set to a period from when the turn indicator 14 is operated by the driver operating and switching the position of the operating lever, to the current point. The notification executing unit 23 calculates the integrated yaw rate value $\Sigma\theta$ by integrating the yaw rates in the same direction as the indicated direction indicated by the turn signal of the turn indicator 14.

At subsequent step S102, the notification executing unit 23 determines whether or not the integrated yaw rate value $\Sigma\theta$ is greater than a determination value $\theta$th. When determined that the integrated yaw rate value $\Sigma\theta$ is the determination value θth or less, the notification executing unit 23 proceeds to step S105 and determines that the own vehicle 40 is not making a left/right turn. Meanwhile, when determined that the integrated yaw rate value Σθ is greater than the determination value θth, the notification executing unit 23 proceeds to step S103.

At step S103, the notification executing unit 23 determines whether or not the vehicle speed detected by the vehicle speed sensor 12 is lower than the determination vehicle speed Vth. The determination vehicle speed Vth is a vehicle speed determination value for determining whether or not the own vehicle 40 is attempting to make a left or right turn. For example, the determination vehicle speed Vth is set to a value of 30 to 40 km/h. According to the present embodiment, the own vehicle speed after the point at which the integrated yaw rate value Σθ becomes greater than the determination value θth is compared with the determination vehicle speed Vth.

When determined that the own vehicle speed is the determination vehicle speed Vth or higher, the notification executing unit 23 proceeds to step S105 and determines that the own vehicle 40 is not making a left/right turn. Meanwhile, when determined that the own vehicle speed is lower than the determination vehicle speed Vth, the notification executing unit 23 proceeds to step S104. The notification executing unit 23 determines that the own vehicle 40 is making a left/right turn and ends the present routine. When the turn signal switches from on to off before the integrated yaw rate value Σθ exceeds the determination value θth or before the own vehicle speed becomes lower than the determination vehicle speed Vth, the notification executing unit 23 determines NO at step S100 and proceeds to step S105. The notification executing unit 23 determines that the own vehicle 40 is not making a left/right turn.

Next, a sign notifying process performed by the notification executing unit 23 will be described with reference to FIG. 4. This process is performed by the notification executing unit 23 at a predetermined cycle.

Figure 4:
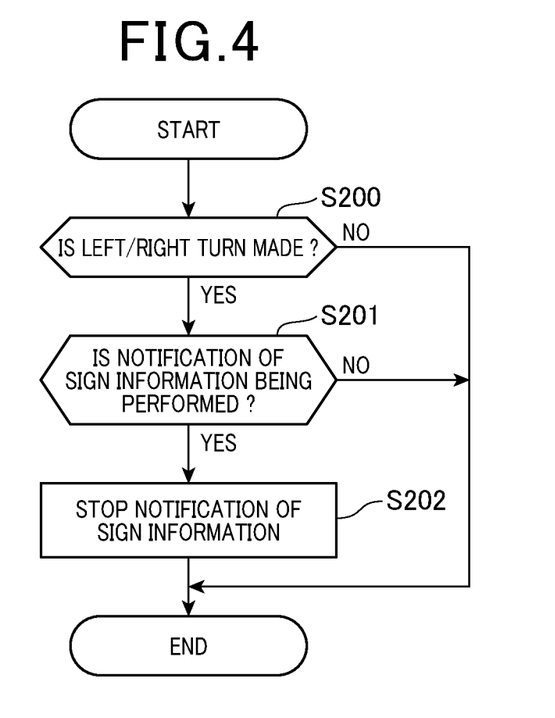
FIG. 4 is a flowchart of a processing procedure for a sign notifying process according to the embodiment.

In FIG. 4, at step S200, the notification executing unit 23 determines whether or not the own vehicle 40 is making a left/right turn, based on the result of the left/right turn determining process in FIG. 3. When determined that the own vehicle 40 is not making a left/right turn, the notification executing unit 23 immediately ends the present routine. Meanwhile, when determined that the own vehicle 40 is making a left/right turn, the notification executing unit 23 proceeds to step S201. The notification executing unit 23 determines whether or not the driver is being notified of the sign information indicated on the road sign recognized by the sign recognizing unit 21. Here, the notification executing unit 23 determines whether or not the sign information applied to the traffic lane in which the own vehicle is currently traveling is displayed on the monitor 31.

When determined that the traffic sign on the own traffic lane is not recognized and the driver is not being notified of the sign information, the notification executing unit 23 determines NO at step S201 and immediately ends the present routine. Meanwhile, when determined that the driver is being notified of the sign information, the notification executing unit 23 proceeds to step S202. The notification executing unit 23 stops notification of the sign information by the notifying unit 30. Here, the notification executing unit 23 deletes the sign information on the monitor 31 that is currently being displayed.

Figure 5:
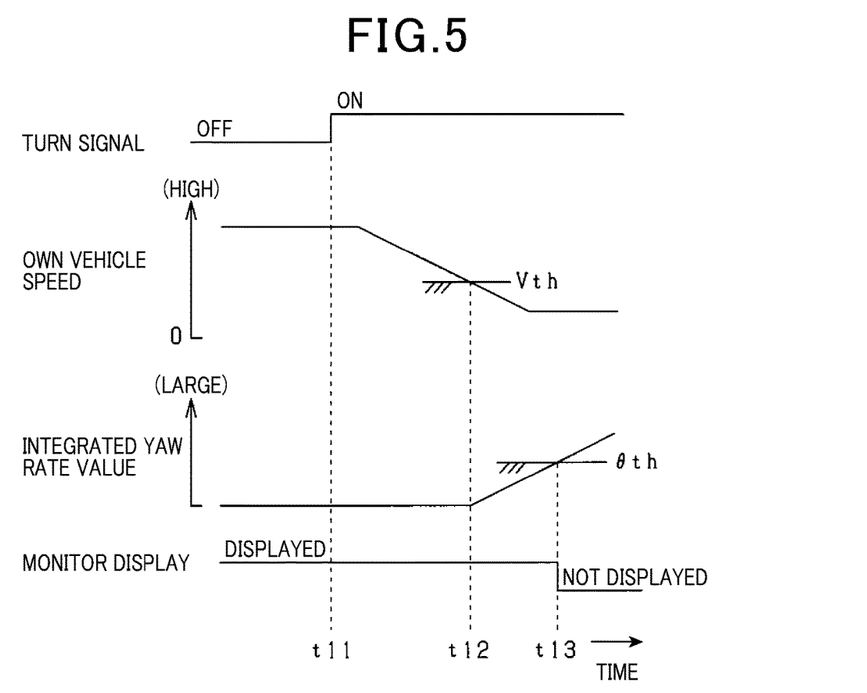
FIG. 5 is a time chart of a transition in monitor display of sign information according to the embodiment.

Next, a specific aspect of the transition in the monitor display of the sign information will be described with reference to the time chart in FIG. 5. The scene in which the own vehicle 40 is traveling is the same as that in FIG. 2. In FIG. 5, it is supposed that the driver is making a left turn at an intersection while traveling at a vehicle speed that is the determination vehicle speed Vth or higher. At this time, when the driver operates the turn indicator 14, the turn signal is switched from off to on (time t11).

In addition, the driver performs an operation to release the accelerator, apply the brakes, and the like, thereby reducing the vehicle speed of the own vehicle 40. The vehicle speed of the own vehicle 40 eventually becomes lower than the determination vehicle speed Vth (time t12). When the integrated yaw rate value Σθ in the leftward direction exceeds the determination value θth as a result of the driver operating the steering wheel, the sign information displayed on the monitor 31 is deleted and the sign information is no longer displayed (time t13).

According to the present embodiment described in detail above, the following excellent effects are achieved.

Based on the vehicle speed of the own vehicle 40 and the operating information of the turn indicator 14, a scene in which the road will momentarily change as a result of the own vehicle 40 making a left turn, a right turn, or the like, or a scene after the road changes can be detected. When the road changes, the sign information applied to the own traffic lane may also change in accompaniment. In this regard, as a result of the above-described configuration, a situation in which the driver is provided with uncertain sign information can be prevented to the greatest possible extent. As a result, the driver can be provided with accurate assistance in safe driving.

Specifically, in a state in which the driver is being notified of the sign information, the sign information displayed on the monitor 31 is deleted if the predetermined conditions including the following two conditions are met: (1) the own vehicle speed becomes lower than the determination vehicle speed Vth; and (2) the turn indicator 14 is operated. When the turn indicator 14 is operated to indicate the right-turn indication direction or the left-turn indication direction while the own vehicle 40 is traveling, and the own vehicle speed becomes a low speed, the likelihood is high that the own vehicle 40 is making a left turn or a right turn, rather than changing traffic lanes. In light of this likelihood, a differentiation can be made between a left/right turn and a lane change, as a result of the above-described configuration. Consequently, uncertain signal information being provided when a left/right turn is made can be prevented. In addition, during lane change, notification of the sign information being erroneously stopped regardless of the road not changing can be suppressed.

The notification of the sign information to the driver is stopped based on the own vehicle speed, the operating information of the turn indicator 14, and the steering angle of the own vehicle 40. Specifically, after the turn signal is switched to on, the own vehicle speed at the time the integrated yaw rate value Σθ becomes greater than the determination value θth or subsequent thereto is compared with the determination vehicle speed Vth. Under a condition that the own vehicle speed is lower than the determination vehicle speed Vth, the own vehicle 40 is determined to be making a left/right turn. The notification of the sign information to the driver is stopped. A driver who is making a left/right turn ordinarily operates the steering wheel to make the left/right turn.

Therefore, as a result of the steering angle of the own vehicle 40 being added to the determination conditions, the accuracy in determining a scene in which the road changes can be further improved. In addition, the notification of the sign information of the road 61 before the left/right turn is continued until the own vehicle 40 actually makes the left/right turn. As a result, for example, the driver can be prevented from experiencing discomfort caused by no longer being notified of the sign information in a state in which the driver is traveling straight ahead.

Other Embodiments

The present disclosure is not limited to the above-described embodiment. For example, the present disclosure may be carried out as follows. Hereafter, sections according to the embodiments that are the same or equivalent are given the same reference numbers. Descriptions of sections having the same reference numbers are omitted.

In FIG. 2, the sign information displayed on the monitor 31 is deleted at the timing at which the own vehicle 40 is transitioning from the road 61 on which the own vehicle 40 is traveling before the left turn to the road that is the travel route after the left turn, that is, during the left turn. However, the timing at which to stop the notification of the sign information is not limited thereto. For example, the notification of the sign information may be stopped at the timing after the own vehicle 40 has completed making the left/right turn.

According to the above-described embodiment, the integrated yaw rate value $\Sigma\theta$ is taken into consideration as a parameter related to the steering angle of the own vehicle 40. The notification of the sign information to the driver is stopped under a condition that the integrated yaw rate value $\Sigma\theta$ exceeds the determination value $\theta$th. However, the parameter related to the steering angle of the own vehicle 40 is not limited to the integrated yaw rate value $\Sigma\theta$. For example, a detection value of a steering angle sensor that detects the steering angle of the steering wheel operated by the driver may be used.

According to the above-described embodiment, the notification of the sign information to the driver is stopped based on the own vehicle speed, the operating information of the turn indicator 14, and the steering angle of the own vehicle 40. However, the notification of the sign information to the driver may be stopped through use of the own vehicle speed and the operating information of the turn indicator 14, without taking into consideration the steering angle of the own vehicle.

Specifically, for example, the notification of the sign information is stopped upon two conditions being met, that is, the own vehicle speed becoming lower than the determination vehicle speed Vth and the turn indicator 14 being operated, regardless of whether or not the integrated yaw rate value $\Sigma\theta$ exceeds the determination value $\theta$th. As a result of this configuration, the notification of the sign information can be stopped at a timing before the own vehicle 40 starts to make the left/right turn. In this case, the notification of the sign information before the left/right turn to the driver can be stopped at the earliest possible timing.

According to the above-described embodiment, a left/right turn is determined not to be made at step S105 when the turn signal is determined to be off at step S100 in FIG. 3. However, a period from when the turn signal switches to on until the elapse of a predetermined amount of time (such as several seconds) after the turn signal switches to off may be set as the period over which the left/right turn determination is performed.

Specifically, the integrated yaw rate value $\Sigma\theta$ is calculated during a period from when the turn signal is switched to on until a predetermined amount of time elapses after the turn signal is switched to off. The own vehicle 40 is determined to make a left/right turn under a condition that the calculated integrated yaw rate value $\Sigma\theta$ exceeds the determination value $\theta$th and the own vehicle speed at this time is lower than the determination vehicle speed Vth.

The determination conditions for determining whether or not the own vehicle 40 is making a left/right turn in the left/right turn determining process may include conditions other than the condition related to the own vehicle speed, the condition related to the operating information of the turn indicator 14, and the condition related to the steering angle. For example, the determination conditions may include a condition that the road is determined to change, based on an image captured by the imaging apparatus 11 or data from a navigation system.

According to the above-described embodiment, a description is given using an example in which the information indicated by the traffic sign recognized by the sign recognizing unit 21 is displayed on the monitor 31. However, the information may be outputted as audio from the speaker 32. Alternatively, the display on the monitor 31 and audio output from the speaker 32 may be simultaneously performed. In addition, the traffic sign to be subjected to notification as the sign information is not limited to the speed limit sign. Various traffic signs are applicable.

The above-described constituent elements are conceptual and are not limited to the above-described embodiment. For example, functions provided by a single constituent element may be actualized such as to be dispersed among a plurality of constituent elements. Functions provided by a plurality of constituent elements may be actualized by a single constituent element.

What is claimed is:

1. A driving assistance apparatus that assists in driving of an own vehicle, the driving assistance apparatus comprising:
   a processor;
   a memory;
   a sign recognizing unit that recognizes, via the processor, a traffic sign from an image captured by an on-board imaging apparatus, the traffic sign corresponding to a road on which the own vehicle is travelling; and
   a notification executing unit that notifies a driver, via the processor, of sign information that is information indicated by the traffic sign recognized by the sign recognizing unit, the sign information being stored in the memory, wherein
   the notification executing unit stops notifying the driver of the sign information that was stored in the memory based on an indication that the own vehicle is changing roads, the indication based on a vehicle speed of the own vehicle and operating information of a turn indicator of the own vehicle under a condition that the driver is being notified of the sign information.

2. The driving assistance apparatus according to claim 1, wherein:
   the notification executing unit stops notifying the driver of the sign information if a predetermined condition is met in a state in which the driver is being notified of the sign information, the predetermined condition including: a first condition that the vehicle speed becomes lower than a determination vehicle speed; and a second condition that the turn indicator is operated.

3. The driving assistance apparatus according to claim 1, wherein:

the notification executing unit stops notifying the driver of the sign information based on the vehicle speed, the operating information, and a steering angle of the own vehicle.

4. The driving assistance apparatus according to claim 2, wherein:
the notification executing unit stops notifying the driver of the sign information based on the vehicle speed, the operating information, and a steering angle of the own vehicle.

5. A driving assistance method that is performed by a driving assistance apparatus that assists in driving of an own vehicle, the driving assistance method comprising:
recognizing, via a processor, a traffic sign from an image captured by an on-board imaging apparatus, the traffic sign corresponding to a road on which the own vehicle is travelling;
notifying, via the processor, a driver of sign information that is information indicated by the recognized traffic sign, the sign information being stored in a memory; and
stopping notifying the driver of the sign information, based on an indication that the own vehicle is changing roads, the indication based on a vehicle speed of the own vehicle and operating information of a turn indicator of the own vehicle under a condition that the driver is being notified of the sign information.

* * * * *